Figure 1:
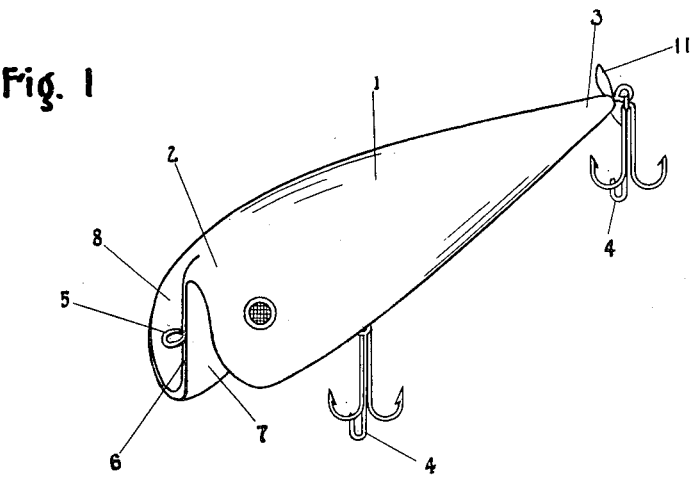

Feb. 26, 1952 — P. H. RAINEY — 2,587,218
FISHING LURE
Filed June 16, 1948

INVENTOR.
Perry H. Rainey
BY Stewart Blackwell
his Attorney

Patented Feb. 26, 1952

2,587,218

UNITED STATES PATENT OFFICE 2,587,218

FISHING LURE

Perry Hubert Rainey, Opa-Locka, Fla.

Application June 16, 1948, Serial No. 33,405

2 Claims. (Cl. 43—42.48)

This invention relates to improvements in artificial bait and, more especially, to fishing lures commonly known in the art as "plugs," which simulate the appearance, in more or less degree, of the smaller specie of bait fish.

The fishing lure to which the invention may be applied, in particular, has utility in still fishing or casting, wherein the relatively slight spinning of the lure is desirable to attract the catch.

Prior lures of the revoluble type, of which I am aware, generally have spinning characteristics of high speed of revolution, thereby rendering these lures objectionable to fishermen whose lines and gear become easily fouled by the rapidly spinning bait. Such lures are usually shaped to have helical grooves extending along their outer peripheries and similar carvings which tend to destroy the simulation of the lures to the body of a fish. This deformation of the bait has a further undesirable characteristic from the dealer's standpoint as patrons are apt to select their lures according as the bait resembles the fish sought to be imitated.

An object of the invention is to provide a fishing lure in which the speed of rotation on spinning will be relatively low.

Another object is to provide a fishing lure of the type and for the purposes described which will substantially simulate the body of the smaller specie of live fish bait.

Other advantages of the invention will be discerned from the description thereof hereinafter set forth.

As contemplated by the invention, the fishing lure comprises an elongated body in substantial simulation of a fish, terminating in the head thereof in a longitudinally disposed, substantially upright fin formed in the face of the lure. The fin defines a partition wall separating two concave grooves formed on each side thereof; one groove inclines upwardly, vanishing into the upper or back periphery of the lure and the other groove inclines downwardly and vanishes into the bottom or belly periphery thereof. The lure is provided with the conventional hooks, attaching eyes, and fan blade assemblies.

Figure 2:
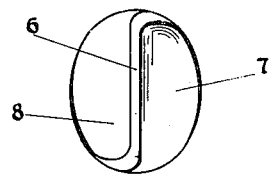
Figure 3:
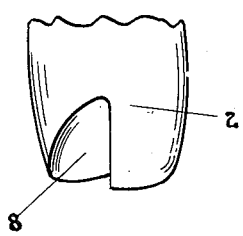
Figure 4:
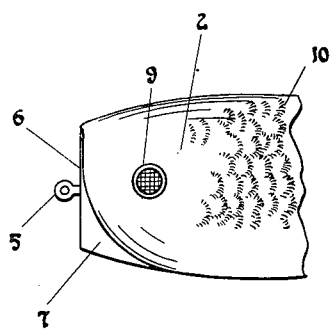

The invention is embodied in a fishing lure shown in the attached drawing in which the views are as follows, like reference numerals designating identical parts throughout the several views:

Fig. 1, a perspective of the lure;

Fig. 2, a frontal end elevation;

Fig. 3, a plan of the head portion;

Fig. 4, a partial elevation of the head portion taken from the right side as viewed in Fig. 2 and Fig. 3.

The fishing lure comprises an elongated body 1, fashioned to simulate a bait fish of the smaller specie, and terminating in a head portion 2, and a tail portion 3.

Swiveled to the under body of the lure are the conventional fish hooks 4, and an attaching eye 5 is secured to the head portion at the end thereof whereby to couple the lure into the fishing rig assembly.

Frontally of the head portion the lure is faced with a central, substantially upright fin 6, disposed along the longitudinal axis of the body 1. The head portion is grooved on each side of the fin 6 to provide a pair of concave channels 7 and 8, extending through the face of the head, the channel on one side inclining upwardly and rearwardly, as the channel 8, and the channel on the opposite side inclining downwardly and rearwardly, as the channel 7, both channels "vanishing" respectively into the top, or back, periphery of the lure and the bottom, or belly, periphery thereof.

Thus, the head portion 2 is formed in the face thereof to define a stabilizing member embodied in the fin 6, a function of which is to interrupt the spiral convolution which, except for the fin, would be presented by the juxtaposition of the channels 7 and 8. These channels have a tendency to impart a rotational movement to the lure when drawn through the water, but any excessive spinning of the lure is impeded by virtue of the fin 6, as will be understood from the foregoing description.

The body 1 may be provided with a pair of eyes 9, painted thereon, and the conventional scale demarkation 10 may be painted on the upper side peripheries of the lure.

A conventional fan, or agitator, 11, may be mounted endwise of the tail portion 3, to provide a light reflecting glint producing member supplementing the attraction characteristics of the lure.

The bottom, or belly, periphery of the lure is painted a white or light contrasting color in relation to the color of the top, or back, periphery thereof.

In practice, the fishing lure is cast, as in still fishing, to lie in the water, and will normally assume a substantially upright position therein. On a slight pull of the line, the lure will roll over to expose the white under belly thereof, thereby presenting the attraction essential in angling to lure the fish. Excessive spinning of the lure is impeded by virtue of the stabilizing fin 6, and the fouling of lines and gear thus minimized.

Further, the conformation of the head resulting from my arrangement of the fin 6 and the channels grooved therebeside, permits the production of a lure having substantial visual characteristics to simulate the appearance of a live bait fish conventionally used in angling.

Having thus described the invention and the mode of its application, what I claim as new and desire to secure by Letters Patent is:

1. In a fishing lure in dynamic unbalance about the longitudinal axis thereof, the combination of an elongated body simulating the appearance of a fish and terminating in the frontal head portion thereof in a central and substantially upright fin, said fin and adjacent parts of the front of the head portion defining a pair of channels and said fin defining a partition between said channels, one of said channels inclining rearwardly and upwardly and vanishing into the top periphery of said body and the other channel inclining rearwardly and downwardly and vanishing into the bottom periphery of said body, each of said channels forming a single groove in said head portion on its respective side of said fin, a plurality of fish hooks carried by said body, and means to attach said body to a fishing line.

2. In a fishing lure in dynamic unbalance about the longitudinal axis thereof, the combination of an elongated body simulating the appearance of a fish and terminating in the frontal head portion thereof in a central and substantially upright fin formed integrally therewith and extending forwardly therefrom, said fin and adjacent parts of the front of the head portion defining a pair of channels and said fin defining a partition between said channels, one of said channels inclining rearwardly and upwardly and vanishing into the top periphery of said body and the other channel inclining rearwardly and downwardly and vanishing into the bottom periphery of said body, each of said channels forming a single groove in said head portion on its respective side of said fin, a plurality of fish hooks carried by said body, and means to attach said body to a fishing line.

PERRY HUBERT RAINEY.

REFERENCES CITED

The following references are of record in the file of this patent:

UNITED STATES PATENTS

| Number | Name | Date |
| --- | --- | --- |
| Des.54,391 | Dickens | Feb. 10, 1920 |
| 935,657 | Howe | Oct. 5, 1909 |
| 1,239,956 | Phinney | Sept. 11, 1917 |
| 1,338,953 | Odell | May 4, 1920 |
| 1,468,627 | Dickens | Sept. 25, 1923 |
| 1,489,207 | Hall | Apr. 1, 1924 |
| 1,725,636 | Heaslip | Aug. 20, 1929 |
| 2,100,289 | Khoenle | Nov. 23, 1937 |
| 2,305,865 | Goyings | Dec. 22, 1942 |